United States Patent
Chiu et al.

(10) Patent No.: US 11,057,403 B2
(45) Date of Patent: Jul. 6, 2021

(54) SUSPICIOUS PACKET DETECTION DEVICE AND SUSPICIOUS PACKET DETECTION METHOD THEREOF

(71) Applicant: Institute For Information Industry, Taipei (TW)

(72) Inventors: Chi-Kuan Chiu, Taoyuan (TW); Hsiao-Hsien Chang, Taipei (TW); Te-En Wei, Taipei (TW)

(73) Assignee: Institute For Information Industry, Taipei (TW)

( * ) Notice: Subject to any disclaimer, the term of this patent is extended or adjusted under 35 U.S.C. 154(b) by 478 days.

(21) Appl. No.: 16/202,084

(22) Filed: Nov. 27, 2018

(65) Prior Publication Data
US 2020/0145435 A1 May 7, 2020

(30) Foreign Application Priority Data

Nov. 1, 2018 (TW) ................. 107138823

(51) Int. Cl.
*H04L 29/06* (2006.01)
*G06F 16/955* (2019.01)
(Continued)

(52) U.S. Cl.
CPC ........ *H04L 63/1416* (2013.01); *G06F 16/906* (2019.01); *G06F 16/955* (2019.01); *G06K 9/6218* (2013.01); *G06N 20/00* (2019.01); *H04L 63/14* (2013.01); *H04L 63/1441* (2013.01); *H04L 69/22* (2013.01)

(58) Field of Classification Search
CPC ............................ H04L 63/14; H04L 63/1416
See application file for complete search history.

(56) References Cited

U.S. PATENT DOCUMENTS 7,877,806 B2 * 1/2011 Repasi .................. G06F 21/554
726/23
8,676,729 B1 * 3/2014 Keralapura ......... H04L 63/1416
706/12
(Continued)

FOREIGN PATENT DOCUMENTS

CN 103916288 B 11/2017

OTHER PUBLICATIONS

Office Action to the corresponding Taiwan Patent Application No. 107138823 rendered by the Taiwan Intellectual Property Office (TIPO) dated Aug. 22, 2019, 5 pages.

Primary Examiner — James R Turchen
(74) Attorney, Agent, or Firm — Skaar Ulbrich Macari, P.A.

(57) ABSTRACT

A suspicious packet detection device and a suspicious packet detection method thereof are provided. The suspicious packet detection device captures an HTTP packet transmitted from an internal network to an external network, and based on an HTTP header of the HTTP packet, determines that the HTTP packet belongs to one of a browser category and an application category and identifies the HTTP packet as one of a normal packet and a suspicious packet. When the HTTP packet is identified as the normal packet, the suspicious packet detection device further verifies whether the HTTP packet is the suspicious packet or not by comparing the HTTP header with relevance information or by using a URL classification model.

16 Claims, 9 Drawing Sheets

(51) Int. Cl.
  *G06K 9/62* (2006.01)
  *G06N 20/00* (2019.01)
  *G06F 16/906* (2019.01)

(56) References Cited

U.S. PATENT DOCUMENTS

| | | | |
|---|---|---|---|
| 8,762,298 B1 | 6/2014 | Ranjan et al. | |
| 8,879,388 B2* | 11/2014 | Lund | H04L 63/1441 |
| | | | 370/235 |
| 9,888,033 B1* | 2/2018 | Li | H04L 47/25 |
| 10,038,715 B1* | 7/2018 | Majkowski | H04L 63/1416 |
| 10,778,699 B1* | 9/2020 | Bradley | H04L 63/1441 |
| 10,805,320 B1* | 10/2020 | Wang | H04L 63/0245 |
| 2008/0301812 A1* | 12/2008 | Chow | H04L 63/1416 |
| | | | 726/24 |
| 2011/0041182 A1* | 2/2011 | Stenfelt | H04L 63/145 |
| | | | 726/23 |
| 2012/0284791 A1* | 11/2012 | Miller | G06N 7/005 |
| | | | 726/22 |
| 2013/0263268 A1* | 10/2013 | Kim | H04L 63/1458 |
| | | | 726/23 |
| 2014/0047543 A1* | 2/2014 | Kim | H04L 63/1441 |
| | | | 726/23 |
| 2014/0101764 A1* | 4/2014 | Montoro | G06F 21/56 |
| | | | 726/23 |
| 2014/0181972 A1* | 6/2014 | Karta | H04L 63/1416 |
| | | | 726/23 |
| 2015/0026794 A1* | 1/2015 | Zuk | H04L 69/22 |
| | | | 726/13 |
| 2015/0065085 A1* | 3/2015 | Sheikh Naziruddin | H04W 4/24 |
| | | | 455/406 |
| 2015/0222526 A1* | 8/2015 | Baykal | H04L 45/308 |
| | | | 370/352 |
| 2016/0315909 A1* | 10/2016 | von Gravrock | H04L 63/1425 |
| 2017/0126714 A1* | 5/2017 | Nooka | H04L 63/1425 |
| 2019/0058733 A1* | 2/2019 | Wright | H04L 63/1491 |
| 2019/0124010 A1* | 4/2019 | Murgia | H04L 67/322 |
| 2020/0374306 A1* | 11/2020 | Dai | H04L 41/145 |

* cited by examiner

SUSPICIOUS PACKET DETECTION DEVICE AND SUSPICIOUS PACKET DETECTION METHOD THEREOF

PRIORITY

This application claims priority to Taiwan Patent Application No. 107138823 filed on Nov. 1, 2018, which is hereby incorporated by reference in its entirety.

FIELD

The present invention relates to a suspicious packet detection device and a suspicious packet detection method thereof. Specifically, the suspicious packet detection device may identify a HyperText Transfer Protocol (HTTP) packet as one of a normal packet and a suspicious packet based on an HTTP header of the HTTP packet, and further verify whether the HTTP packet is a suspicious packet when the HTTP packet is identified as the normal packet.

BACKGROUND

With the development of the science and technology, various applications of network communication are ubiquitous in people's life, and demands of people for network communication are increasing day by day. However, the security of network communication also becomes more and more important.

Currently, one of multiple research issues regarding network security is that: a hacker gives instructions to and manipulate the computers infected by the zombie virus via a command-and-control server (C2 server) so as to attack computers of specific victims (e.g., servers of enterprises), e.g., send spam mails, steal personal information or initiate attack of blocking services or the like. According to zombie virus attack cases in recent years, in addition to using an Internet Relay Chat (IRC) protocol and a Point-to-Point protocol, the C2 server gradually starts to use a HyperText Transfer Protocol (HTTP) to give instructions to computers infected by the zombie virus. As compared to the IRC protocol and the P2P protocol, packets transmitted based on the HTTP (hereinafter called the HTTP packets) have a large flow and are hard to be effectively detected, so general defense and detection systems will not block or detect suspicious HTTP packets, and this gives the hacker an opportunity to hide the instructions within the HTTP packets.

Accordingly, an urgent need is included in the art to provide an HTTP packet detection mechanism which can effectively detect the suspicious HTTP packets.

SUMMARY

Provided is an HTTP packet detection mechanism, which can effectively detect suspicious HTTP packets. Specifically, the HTTP packet detection mechanism may identify suspicious packets by extracting features of HTTP packets for analysis and comparison, and further perform verification through a deep learning algorithm, thereby enhancing the capability of identifying the suspicious packets.

The disclosure includes a suspicious packet detection device which comprises a storage, a network interface and a processor. The storage is configured to store a reference file and an emulated fingerprint file. The reference file records a HyperText Transfer Protocol (HTTP) reference header. The emulated fingerprint file records relevance information. The processor is electrically connected to the storage and the network interface and is configured to perform the following operations: capturing an HTTP packet transmitted from an internal network to an external network via the network interface; and comparing an HTTP header of the HTTP packet with the HTTP reference header to determine that the HTTP packet belongs to one of a browser category and an application category and identify the HTTP packet as one of a normal packet and a suspicious packet. When the HTTP packet is identified as the normal packet and belongs to the browser category, the processor further performs the following operations: determining whether destination domain information and referer information of the HTTP header are included in the relevance information; determining whether the HTTP packet causes a count value associated with the destination domain information within a time window to exceed a first threshold when the destination domain information and the referer information are not included in the relevance information, and re-identifying the HTTP packet as the suspicious packet if the count value exceeds the first threshold. The count value is the total number of a plurality of received HTTP packets within the time window, and another destination domain information and another referer information of another HTTP header of each of the received HTTP packets are not included in the relevance information.

The disclosure also includes a suspicious packet detection method for a suspicious packet detection device. The suspicious packet detection device comprises a storage, a network interface and a processor. The storage stores a reference file and an emulated fingerprint file. The reference file records a HyperText Transfer Protocol (HTTP) reference header. The emulated fingerprint file records relevance information. The suspicious packet detection method is executed by the processor and comprises the following steps: capturing an HTTP packet transmitted from an internal network to an external network via the network interface; and comparing an HTTP header of the HTTP packet with the HTTP reference header to determine that the HTTP packet belongs to one of a browser category and an application category and identify the HTTP packet as one of a normal packet and a suspicious packet. When the HTTP packet is identified as the normal packet and belongs to the browser category, the suspicious packet detection method further comprises the following steps: determining whether destination domain information and referer information of the HTTP header are included in the relevance information; and determining whether the HTTP packet causes a count value associated with the destination domain information within a time window to exceed a first threshold when the destination domain information and the referer information are not included in the relevance information, wherein the count value is the total number of a plurality of received HTTP packets within the time window, and another destination domain information and another referer information of another HTTP header of each of the received HTTP packets are not included in the relevance information; and re-identifying the HTTP packet as the suspicious packet if the count value exceeds the first threshold.

The disclosure further includes a suspicious packet detection device, which comprises a storage, a network interface and a processor. The storage is configured to store a reference file and an emulated fingerprint file. The reference file records a HyperText Transfer Protocol (HTTP) reference header. The emulated fingerprint file records a URL (Uniform Resource Locator) classification model. The processor is electrically connected to the storage and the network interface, and is configured to perform the following operations: capturing an HTTP packet transmitted from an internal network to an external network via the network interface; and comparing an HTTP header of the HTTP packet with the HTTP reference header to determine that the HTTP packet belongs to one of a browser category and an application category and identify the HTTP packet as one of a normal packet and a suspicious packet. When the HTTP packet is identified as the normal packet and belongs to the application category, the processor further performs the following operations: inputting URL information of the HTTP packet into the URL classification model to generate inferred user agent information; and determining whether user agent information of the HTTP packet is identical to the inferred user agent information, and if not, re-identifying the HTTP packet as the suspicious packet.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 3 depicts information relevant to an HTTP packet belonging to a browser category;

DETAILED DESCRIPTION

In the following description, the present invention will be explained with reference to certain example embodiments thereof. These example embodiments are not intended to limit the present invention to any specific example, embodiment, environment, applications or particular implementations described in these example embodiments. Therefore, description of these example embodiments is only for purpose of illustration rather than to limit the present invention.

It shall be appreciated that, in the following embodiments and the attached drawings, elements unrelated to the present invention are omitted from depiction; and dimensional relationships among individual elements in the attached drawings are provided only for ease of understanding, but not to limit the actual scale.

Figure 1:
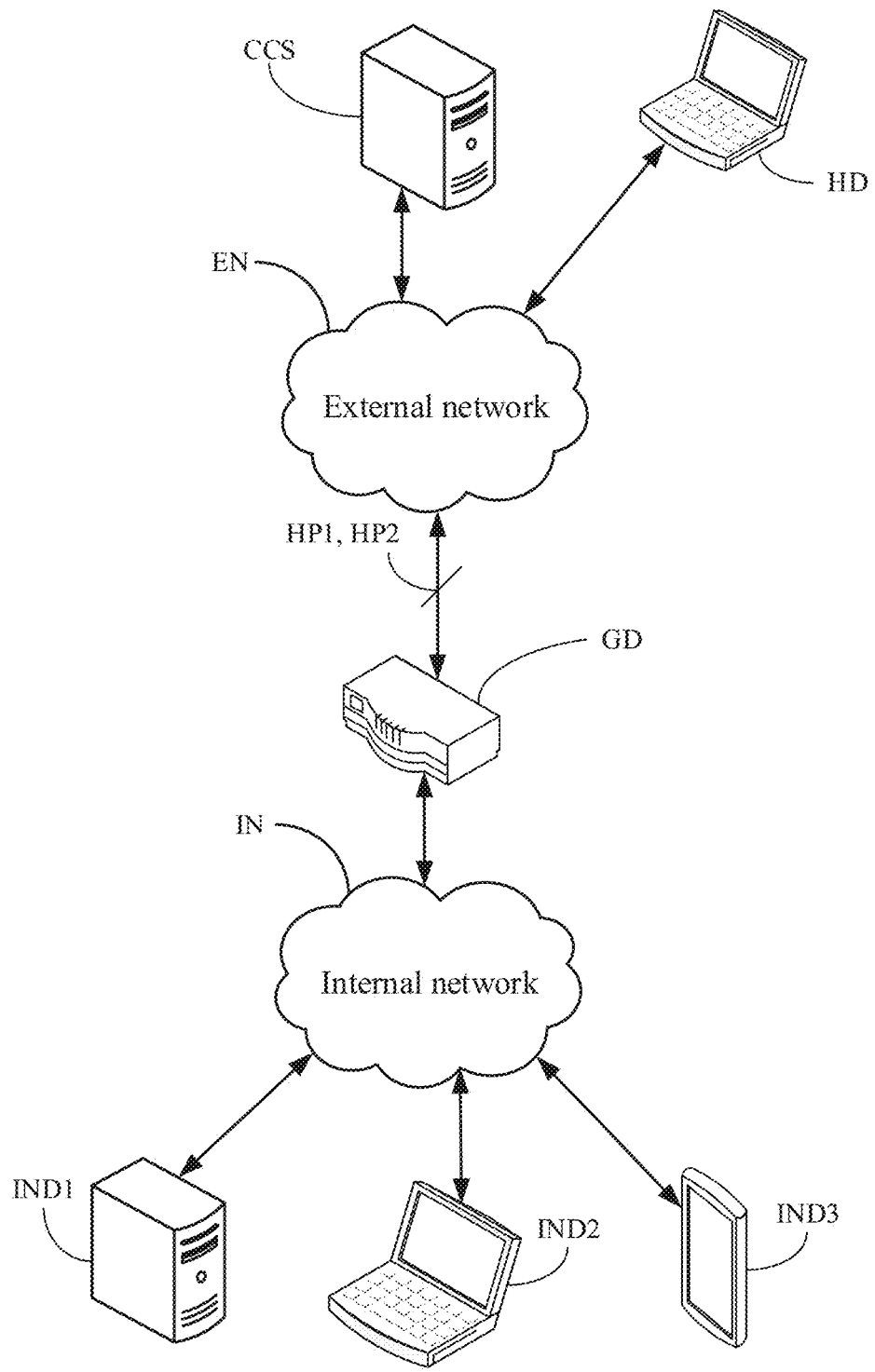
FIG. 1 depicts a schematic view of an implementation scenario according to the present invention.
Figure 2:
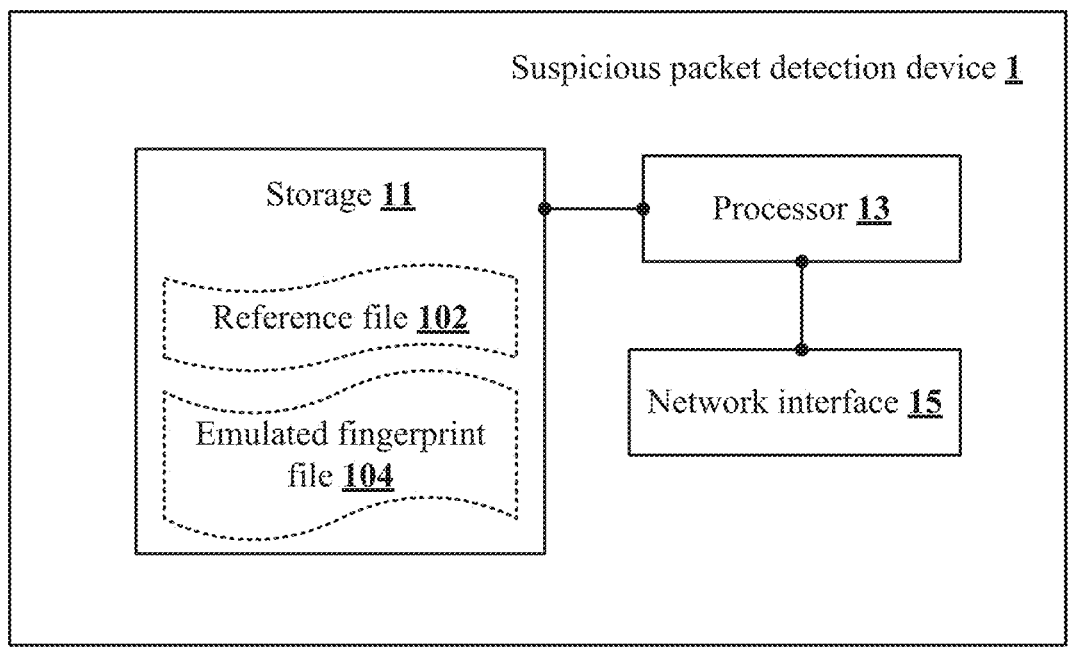
FIG. 2 is a schematic view of a suspicious packet detection device 1 according to the present invention.

A first embodiment of the present invention is as shown in FIG. 1 to FIG. 2. FIG. 1 depicts an implementation scenario according to the present invention, and FIG. 2 is a schematic view of a suspicious packet detection device 1 according to the present invention. The suspicious packet detection device 1 comprises a storage 11, a processor 13 and a network interface 15. The storage 11 and the network interface 15 are electrically connected to the processor 13.

The suspicious packet detection device 1 of the present invention may be implemented as a gateway device GD which is configured to connect to an internal network IN and an external network EN. The internal network IN is connected to a plurality of internal devices (e.g., internal devices IND1, IND2 and IND3). The internal network IN may be an internal network of an enterprise, an internal network of a school or an internal network of any team. The internal network IN usually comprises a plurality of routers (e.g., a wired router, a wireless router or a combination thereof), so each of the internal devices IND1, IND2 and IND3 may be connected to the gateway device GD via one or more routers or directly connected to the gateway device GD via network lines or wireless communication. Each of the internal devices IND1, IND2 and IND3 may be a personal computer, a server, a laptop, a tablet computer or any device that may be infected by zombie viruses. To simplify the description, only three internal devices IND1, IND2 and IND3 are depicted in FIG. 1. However, the number of internal devices is not intended to limit the scope of the present invention.

Moreover, a hacker device HD may distribute the zombie virus to the internal devices IND1, IND2 and IND3 via the external network EN and the gateway device GD by controlling a command-and-control server (hereinafter called the C2 server) CCS. The external network EN may comprise an Internet, a telecommunication network and any wired or wireless communication network. In order to detect whether a hacker gives instructions to the internal devices IND1, IND2 and IND3 infected by the zombie virus with the HTTP protocol via the C2 server CCS, the gateway device GD can screen the suspicious packets by capturing and analyzing the HTTP packets transmitted from the internal network IN to the external network EN.

On the other hand, the suspicious packet detection device 1 of the present invention may also be implemented as an internal device (e.g., the internal device IND1) which is connected to the internal network IN and is connected to the external network EN via the gateway device GD. The internal device IND1 may capture the HTTP packets transmitted from the internal network IN to the external network EN through the gateway device GD and analyze the HTTP packets to screen the suspicious packets. How the suspicious packet detection device 1 of the present invention is implemented as the gateway device GD and the internal device IND1 shall be readily appreciated by those of ordinary skill in the art based on the above description, so the subsequent description only describes how the suspicious packet detection device 1 analyzes the HTTP packets and screens the suspicious packets.

Please continue to refer to FIG. 2. The storage 11 of the suspicious packet detection device 1 stores a reference file 102 and an emulated fingerprint file 104. The reference file 102 records a HyperText Transfer Protocol (HTTP) reference header. The emulated fingerprint file 104 records relevance information.

The processor 13 captures an HTTP packet HP1 transmitted from the internal network IN to the external network EN via the network interface 15. For example, the processor 13 may achieve the purpose of capturing the packet through a packet capturing tool (e.g., a TCP Dump) and acquire the relevance information RI1 of the HTTP packet HP1, as shown in FIG. 3, which is the relevance information of the packet generated by a web browser program. Accordingly, the processor 13 may acquire the relevance information of the HTTP packet, e.g., Transmission Control Protocol (TCP) information, and Hypertext Transfer Protocol (HTTP) information.

Based on the TCP information and the HTTP information of FIG. 3, the processor 13 may further analyze the HTTP packet HP1 to obtain an HTTP header (e.g., destination domain information, user agent information, language information, referer information) and packet size information as shown in the following table 1.

TABLE 1

| Name of information | Content of information |
|---|---|
| Destination domain information | www.railway.gov.tw |
| User agent information | Mozilla |
| Language information | zh-TW, zh; q = 0.9, en-US; q = 0.8, en; q = 0.7 |
| Referer information | http://railway.hinet.net/Foreign/tw/index.html |
| Packet size information | 494 |

Thereafter, the processor 13 compares the HTTP header of the HTTP packet HP1 with the HTTP reference header to determine that the HTTP packet HP1 belongs to one of a browser category and an application category and identify the HTTP packet HP1 as one of a normal packet and a suspicious packet.

For example, the HTTP reference header may comprise user agent reference information, language reference information, domain reference information and field reference information. These reference information may be recorded in advance by collecting packets transmitted by all internal devices that are not affected by the zombie virus to the external network EN within a certain time interval (e.g., several days, one week, one month), and these reference information are used as features during the subsequent detection of the HTTP packet to identify each HTTP packet as a normal packet or a suspicious packet.

The user agent reference information may comprise browser information and application information. The browser information records names of a plurality of web browser programs, e.g., "Mozilla", "Firefox", "Chrome", "Safari", "OPR", "Opera", "MSIC", "Gecko", "Trident", "AppleWebKit", but not limited thereto. The application information records names of a plurality of applications, e.g., "Facebook", "LINE", "Avast", "Microsoft-Delivery-Optimization", "NET Framework", "iTunes", "Spotify", "Microsoft Office", "Java Update", "WeChat", "Windows-Update-Agent", "iosapp.camera", but not limited thereto. Therefore, the processor 13 may compare the user agent information of the HTTP packet HP1 (i.e., Mozilla) with the browser information to determine that the user agent information is included in the browser information and thereby determine that the HTTP packet HP1 belongs to the browser category.

Meanwhile, the processor 13 may determine whether the user agent information of the HTTP packet HP1 is included in the user agent reference information to identify the HTTP packet HP1 as one of a normal packet and a suspicious packet. Therefore, when the user agent information is not included in the user agent reference information, the processor 13 identifies the HTTP packet HP1 as the suspicious packet, and the processor 13 may record the HTTP packet HP1 into a suspicious packet historical file for a manager or relevant personnel of the internal network IN to check for the suspicious packets, or further generate a detection result report and transmit it to the manager or relevant personnel of the internal network IN.

Moreover, when the HTTP packet HP1 belongs to the browser category and is identified as the normal packet via the aforesaid detection mechanism, the present invention further verifies whether it is still possible for the HTTP packet to be the suspicious packet, thereby preventing the case where the HTTP header is emulated by the zombie virus. First, the processor 13 determines whether destination domain information and referer information of the HTTP header are included in the relevance information recorded by the emulated fingerprint file 104.

Figure 4:
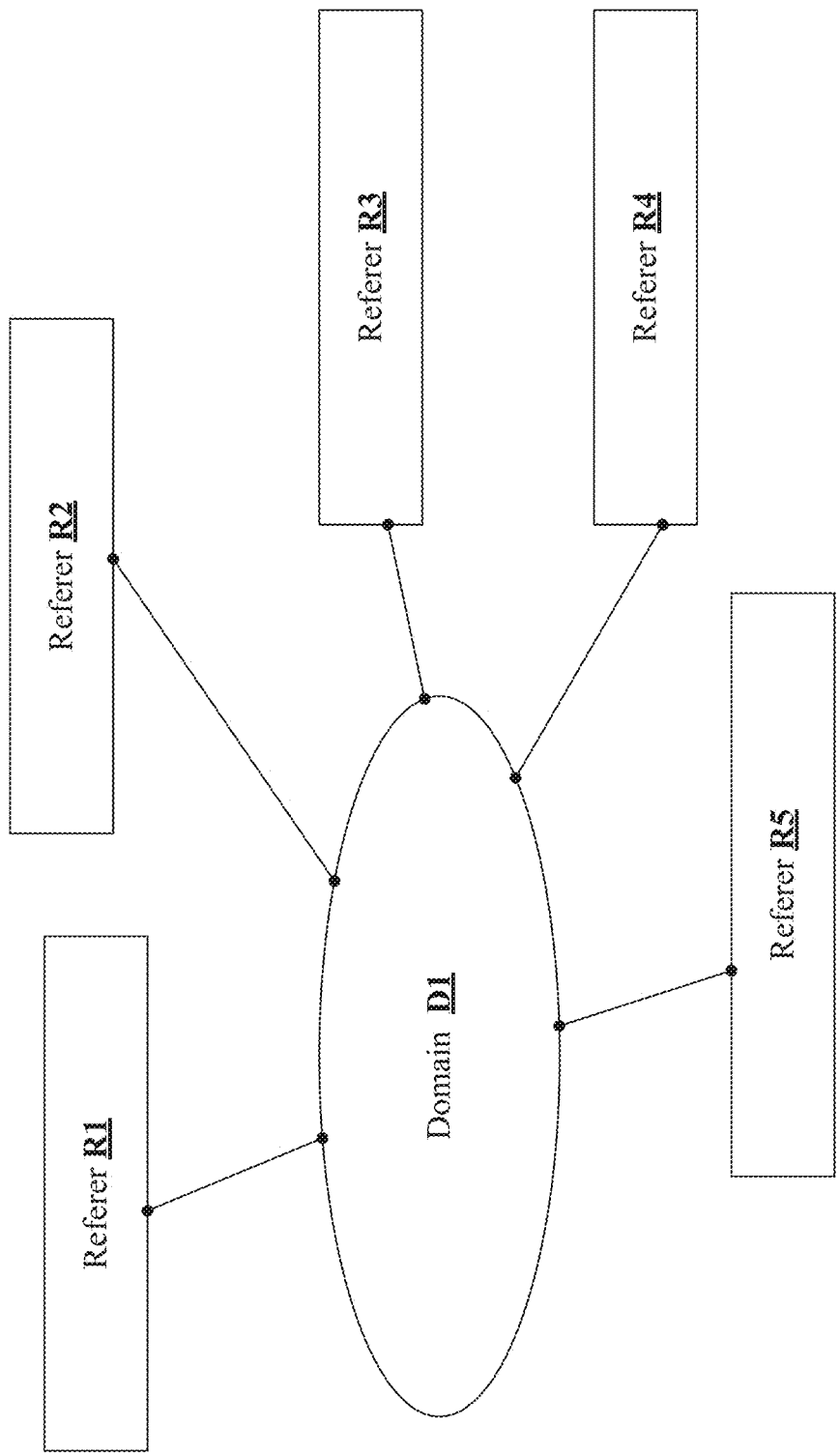
FIG. 4 depicts a relevance diagram of the domain Dl and the referers R1, R2, R3, R4 and R5 associated therewith.

For example, the relevance information may record each domain and its associated referers. FIG. 4 depicts a relevance diagram of a domain D1 and referers R1, R2, R3, R4 and R5 associated therewith. It is conceived that each of other domains and its associated referers may all have the relevance diagram similar to that depicted in FIG. 4, so for simplification of the description, other domains and their associated referers will not be additionally illustrated with figures. Similarly, the domains and their associated referers may be recorded in advance by collecting packets that are transmitted by all internal devices that are not affected by the zombie virus to the external network EN within a certain time interval (e.g., several days, one week, one month).

Therefore, the processor 13 searches the relevance information for a domain (e.g., the domain D1) that is identical to the destination domain information according to the destination domain information (i.e., www.railway.gov.tw). Next, the processor 13 compares the referer information (i.e., http://railway.hinet.net/Foreign/tw/index.html) with the referers R1, R2, R3, R4 and R5 associated with the domain D1 to determine whether the referer information is identical to any of the referers R1, R2, R3, R4 and R5. When the destination domain information and the referer information are not included in the relevance information, the processor 13 determines whether the HTTP packet HP1 causes a count value associated with the destination domain information within a time window to exceed a first threshold, and the processor 13 re-identifies the HTTP packet HP1 as the suspicious packet if the count value exceeds the first threshold. Here, the count value is the total number of a plurality of HTTP packets that have been received within the time window (hereinafter called the received HTTP packets), and another destination domain information and another referer information of another HTTP header of each of the received HTTP packets are not included in the relevance information.

For example, the time window may be selected from 3 minutes, 5 minutes and 6 minutes, and the first threshold may be selected from 100 and 120. As shall be appreciated by those of ordinary skill in the art, if the time window is selected to be shorter and the first threshold is selected to be larger, then it means that the criterion for determining a packet as the suspicious packet is more loose (i.e., the packet is less likely to be re-identified as the suspicious packet); on the contrary, if the time window is selected to be longer and the first threshold is selected to be smaller, then it means that the criterion of determining a packet as the suspicious packet is stricter (i.e., the packet is more likely to be re-identified as the suspicious packet).

Therefore, if the time window is selected to be 5 minutes and the first threshold is selected to be 100, then when the destination domain information is not included in the relevance information, the processor 13 determines whether there have been 100 received HTTP packets having the same destination domain information in the past 5 minutes from the time point at which the HTTP packet HP1 is transmitted (i.e., the total number of the received HTTP packets is 100) and whether the HTTP packet HP1 causes a count value (i.e., 100+1=101) associated with the destination domain information within the 5 minutes to exceed the first threshold (i.e., 100). Similarly, if the time window is selected to be 5 minutes and the first threshold is selected to be 100, then when the destination domain information is included in the relevance information but the referer information is not included in the relevance information, the processor 13 determines whether there have been 100 received HTTP packets having the same destination domain information and the referer information of which are not included in the relevance information either in the past 5 minutes from the time point at which the HTTP packet HP1 is transmitted and whether the HTTP packet HP1 causes a count value (i.e., 100+1=101) associated with the destination domain information within the 5 minutes to exceed the first threshold (i.e., 100).

Similarly, when the HTTP packet HP1 causes the count value associated with the destination domain information within the time window to exceed the first threshold, the processor 13 re-identifies the HTTP packet HP1 as the suspicious packet, and the processor 13 may record the HTTP packet HP1 into a suspicious packet historical file for a manager or relevant personnel of the internal network IN to check for the suspicious packets, or further generate a detection result report and transmit it to the manager or relevant personnel of the internal network IN.

Figure 5:
FIG. 5 depicts information relevant to an HTTP packet belonging to an application category.

Please continue to refer to FIG. 1 to FIG. 2 for a second embodiment of the present invention. As described previously, the processor 13 may achieve the purpose of capturing the packet via a packet capturing tool and acquire the relevance information RI2 of an HTTP packet HP2, as shown in FIG. 5. Different from the first embodiment, in this embodiment, the HTTP packet HP2 is a packet generated by one of other applications rather than by a web browser program. Similarly, based on the TCP information and the HTTP information of FIG. 5, the processor 13 may further analyze the HTTP packet HP2 to obtain an HTTP header (e.g., destination domain information, user agent information, field information, URL information) and packet size information as shown in the following table 2.

TABLE 2

| Name of information | Content of information |
|---|---|
| Destination domain information | 7.tlu.dl.delivery.mp.microsoft.com |
| User agent information | Microsoft Delivery Optimization |
| Field information | Range: byte = 326107136-327155711<br>Connection: Keep-Alive<br>MS-CV: 4NdiW0jrm5pCal.0.91.26.2.1.0.0.11.2.7.5.1.36<br>Content-Length: 0 |
| URL information | http://7.tlu.dl.delivery.mp.microsoft.com/filestreamingservice/files/fd16269d-13de-4d6f-a167-aca78db10e9f?P1=1531284262&P2=301&P3=2 |
| Packet size information | 398 |

Thereafter, the processor 13 compares the HTTP header of the HTTP packet HP2 with the HTTP reference header to determine that the HTTP packet HP2 belongs to one of a browser category and an application category and identify the HTTP packet HP2 as one of a normal packet and a suspicious packet. Similar to the example described in the first embodiment, the processor 13 may compare the user agent information of the HTTP packet HP2 (i.e., Microsoft Delivery Optimization) with the browser information to determine that the user agent information is not included in the browser information, and thereby determine that the HTTP packet HP2 belongs to the application category. Meanwhile, the processor 13 may determine whether the user agent information of the HTTP packet HP2 is included in the user agent reference information to identify whether the HTTP packet HP2 is a normal packet or a suspicious packet.

Moreover, when the HTTP packet HP2 belongs to the application category and is identified as the normal packet via the aforesaid detection mechanism, the present invention further verifies whether it is still possible for the HTTP packet to be the suspicious packet, thereby preventing the case where the HTTP header is emulated by the zombie virus. First, in this embodiment, the emulated fingerprint file 104 further records a URL classification model. The processor 13 inputs the URL information of the HTTP packet HP2 into the URL classification model to generate inferred user agent information. Next, the processor 13 determines whether the user agent information of the HTTP packet is identical to the inferred user agent information. If the user agent information of the HTTP packet is not identical to the inferred user agent information, the processor 13 re-identifies the HTTP packet HP2 as the suspicious packet, and the processor 13 may record the HTTP packet HP2 into the suspicious packet historical file for a manager or relevant personnel of the internal network IN to check for the suspicious packets, or further generate a detection result report and transmit it to the manager or relevant personnel of the internal network IN.

Figure 6:
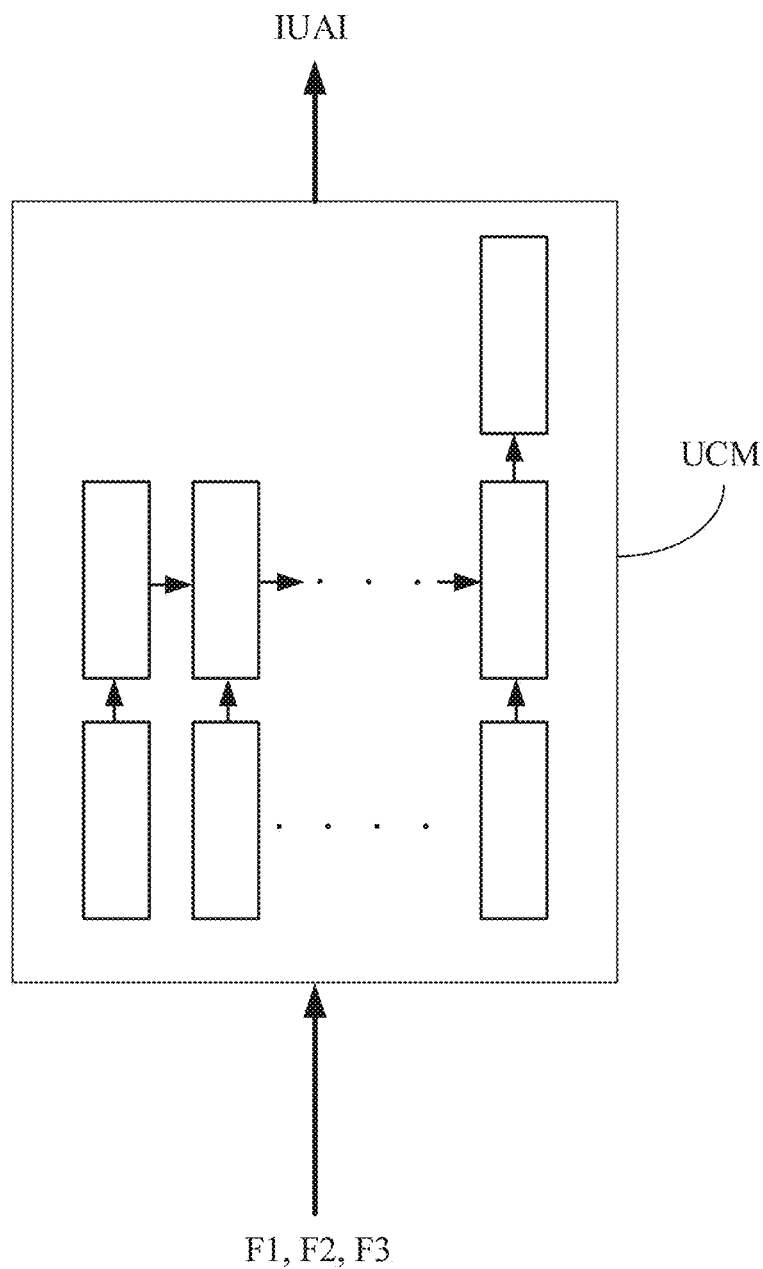
FIG. 6 is a schematic view of a URL classification model UCM according to the present invention.

For example, the URL classification model UCM may be built through supervised learning according to a sequential analysis algorithm and a many-to-one principle, as shown in FIG. 6. During the training process, the processor 13 collects packets that are transmitted by all internal devices that are not affected by the zombie virus to the external network EN within a certain time interval (e.g., several days, one week, one month). The processor 13 uses these packets as the training data, and extracts three features from the URL information of each of the packets, i.e., a domain feature F1, a path feature F2, and a parameter keys feature F3. Taking the URL information of the HTTP packet HP2 as an example for illustration, the domain feature F1 is "7.tlu.dl.delivery-.mp.microsoft.com", the path feature F2 is "filestreamingservice/files/fd16269d-13de-4d6f-a167-aca78db10e9f", and the parameter keys feature F3 is parameters: "P1, P2 and P3". Next, the processor 13 inputs the domain feature F1, the path feature F2, and the parameter keys feature F3 of each URL information into the URL classification model UCM. For the domain feature F1, the path feature F2 and the parameter keys feature F3 of each packet, the URL classification model UCM converts the domain feature F1, the path feature F2, and the parameter keys feature F3 into sequences first, e.g., converts the "7.tlu.dl.delivery.mp.microsoft.com" into to the sequences "7", "tlu", "dl", "delivery", "mp", "microsoft" and "com". Next, the processor 13 performs supervised learning by using a sequential analysis algorithm (e.g., a Recurrent Neural Network (RNN), a Long Short-Term Memory (LSTM) network, a Gated Recurrent Unit (GRU) network) according to a many-to-one principle. The output of the URL classification model UCM in response to the domain feature F1, the path feature F2, and the parameter keys feature F3 of each packet is labeled as user agent information (i.e., inferred user agent information IUAI). How to build the URL classification model UCM via the supervised learning according to the known user agent information in the packet shall be appreciated by those of ordinary skill in the art based on the above description, and thus details thereof will not be further described herein.

Therefore, if the inferred user agent information IUAI generated by inputting the URL information of the HTTP packet HP2 into the URL classification model UCM is not equal to the user agent information of the HTTP packet HP2 (i.e., Microsoft Delivery Optimization), then the processor 13 re-identifies the HTTP packet HP2 as the suspicious packet. In this way, the HTTP packet detection mechanism of the present invention can effectively detect that the HTTP header is a packet emulated by the zombie virus.

Please continue to refer to FIG. 1 to FIG. 3 and FIG. 5 for a third embodiment of the present invention. This embodiment is an extension of the first embodiment and the second embodiment. It is described in the example of the aforesaid embodiments that the processor 13 may identify whether each the HTTP packets HP1 and HP2 is the normal packet or the suspicious packet based on whether the user agent information of each of the HTTP packets HP1 and HP2 is included in the user agent reference information, while in this embodiment, the detection of whether each of the HTTP packets HP1 and HP2 is the suspicious packet is further achieved by the following operations.

In detail, the reference file 102 further records a permissible range, and as described previously, the HTTP reference header may comprise the user agent reference information, the language reference information, the domain reference information and the field reference information. After it is determined that the HTTP packet HP1 belongs to the browser category and the user agent information thereof is included in the user agent reference information, the processor 13 determines whether language information of the HTTP header is included in the language reference information. If the language information of the HTTP header is included in the language reference information, the processor 13 identifies the HTTP packet HP1 as the normal packet. If the language information of the HTTP header is not included in the language reference information, the processor 13 identifies the HTTP packet HP1 as the suspicious packet.

Moreover, when it is determined that the HTTP packet HP2 belongs to the application category the user agent information thereof is included in the user agent reference information, the processor 13 calculates an evaluation value according to whether the destination domain information of the HTTP header is included in the domain reference information, whether field information of the HTTP header is included in the field reference information and whether a packet size of the HTTP packet HP2 falls into a permissible range. If the evaluation value is greater than or equal to a second threshold, the processor 13 identifies the HTTP packet HP2 as the normal packet. If the evaluation value is less than the second threshold, the processor 13 identifies the HTTP packet HP2 as the suspicious packet.

For example, the evaluation value may be obtained by calculating a sum of three score values V1, V2 and V3. When the destination domain information of the HTTP header is included in the domain reference information, the score value V1=1; and on the contrary, the score value V1=0. When the field information of the HTTP header is included in the field reference information, the score value V2=1; and on the contrary, the score value V2=0. When the packet size of the HTTP packet HP2 falls into the permissible range, the score value V3=1; and on the contrary, the score value V3=0. The second threshold may be set to be 1, 2 and 3. If the second threshold is set to be 1, then it means that the processor 13 identifies the HTTP packet HP2 as the normal packet as long as one of the aforesaid three conditions is satisfied. Similarly, if the second threshold is set to be 2, then it means that the processor 13 identifies the HTTP packet HP2 as the normal packet as long as two of the aforesaid three conditions are satisfied. The case where the second threshold is set to be 3 is the strictest condition, and it means that the processor 13 identifies the HTTP packet HP2 as the normal packet only after the aforesaid three conditions are all satisfied.

After the HTTP packet HP1 is identified as a normal packet via the aforesaid operations, the processor 13 further determines whether the destination domain information and the referer information of the HTTP header are included in the relevance information recorded by the emulated fingerprint file 104, as described in the first embodiment, so as to verify whether it is still possible for the HTTP packet to be the suspicious packet, thereby preventing the case where the HTTP header is emulated by the zombie virus. Similarly, after the HTTP packet HP2 is identified as a normal packet via the aforesaid operations, the processor 13 further inputs the URL information of the HTTP packet HP2 to the URL classification model to determine whether the user agent information of the HTTP packet is identical to the inferred user agent information, as described in the second embodiment, so as to verify whether it is still possible for the HTTP packet to be the suspicious packet, thereby preventing the case where the HTTP header is emulated by the zombie virus.

Figure 7A:
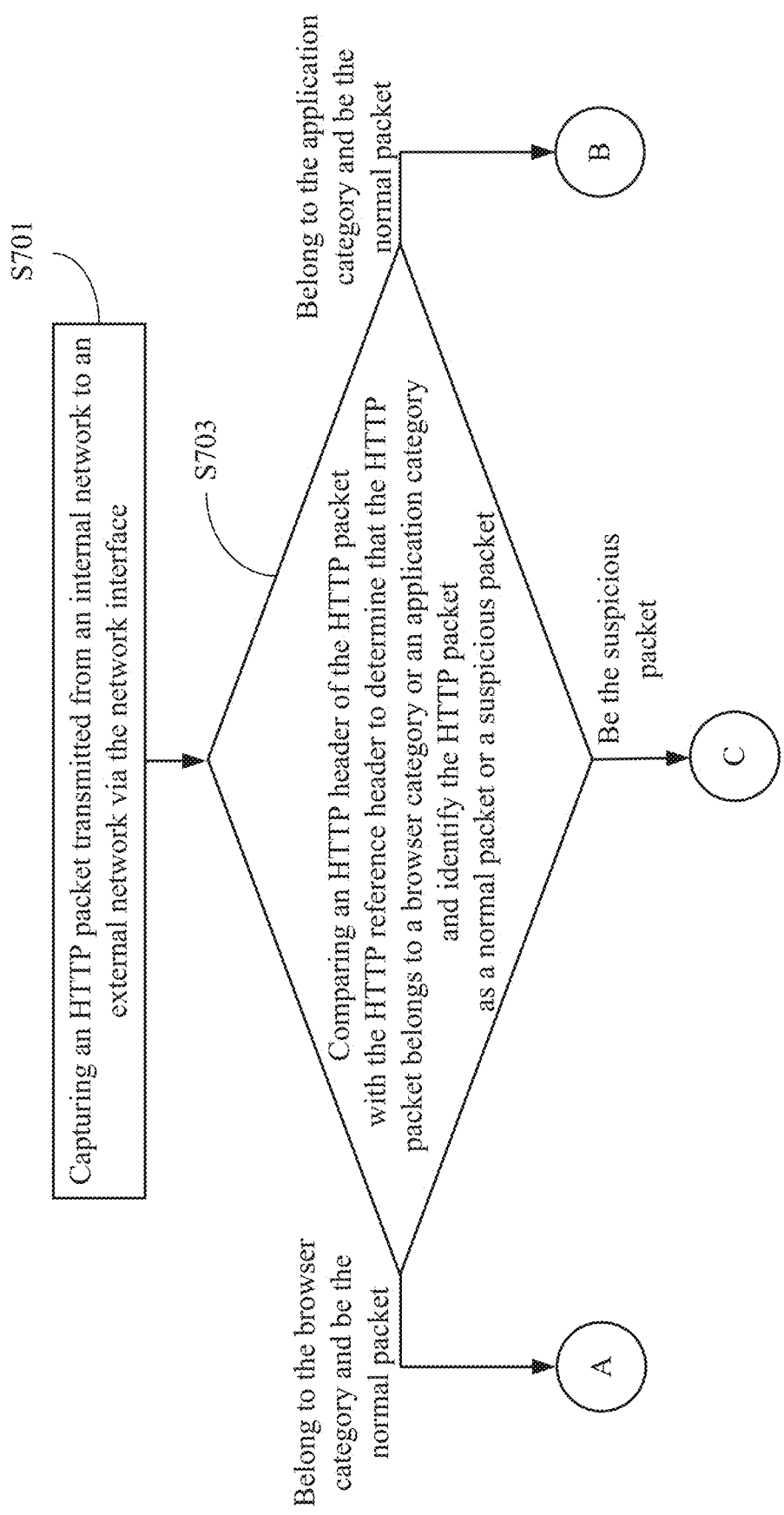
FIG. 7A to FIG. 7C are flowchart diagrams of a suspicious packet detection method according to the present invention.
Figure 7B:
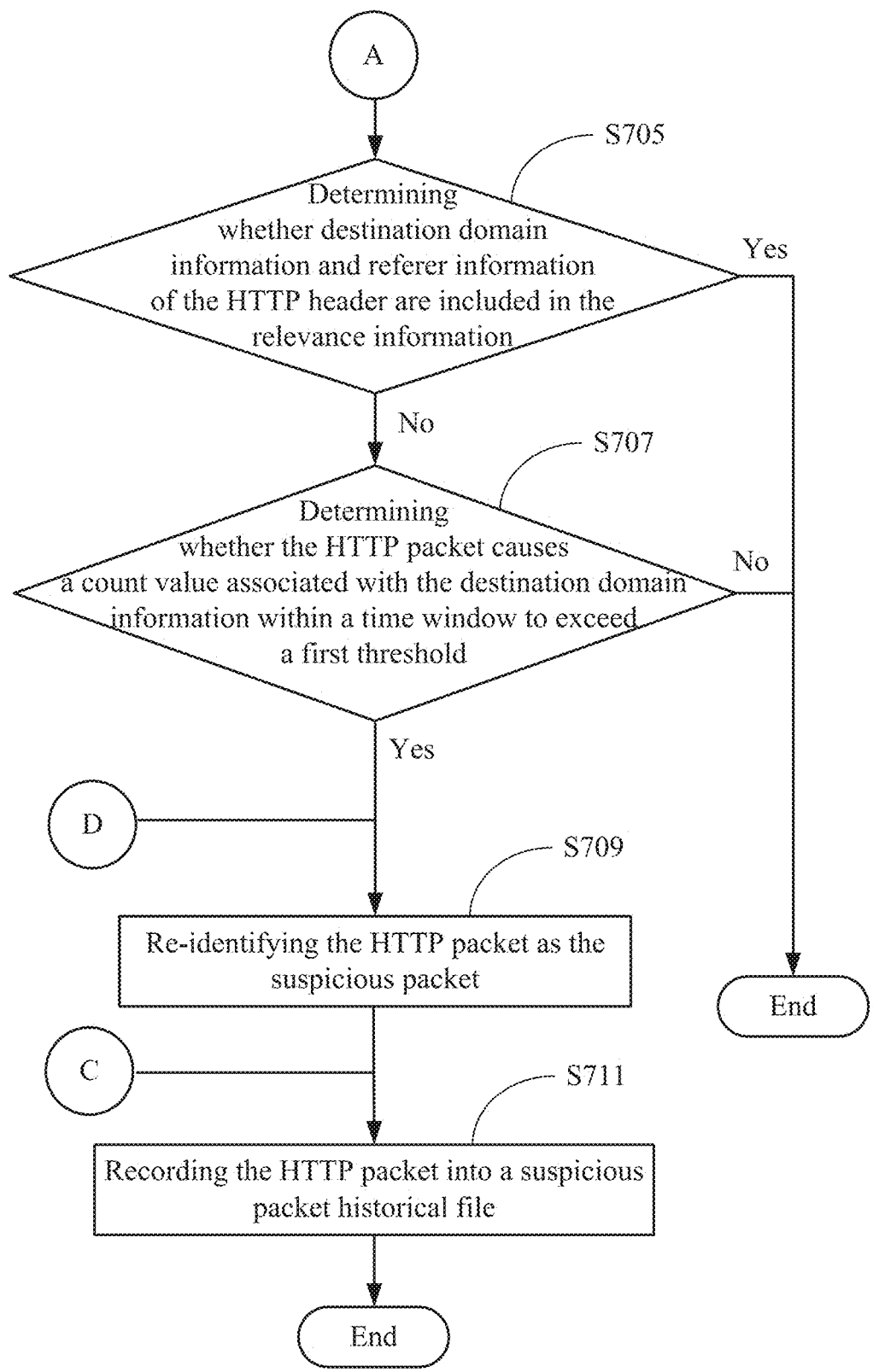
Figure 7C:
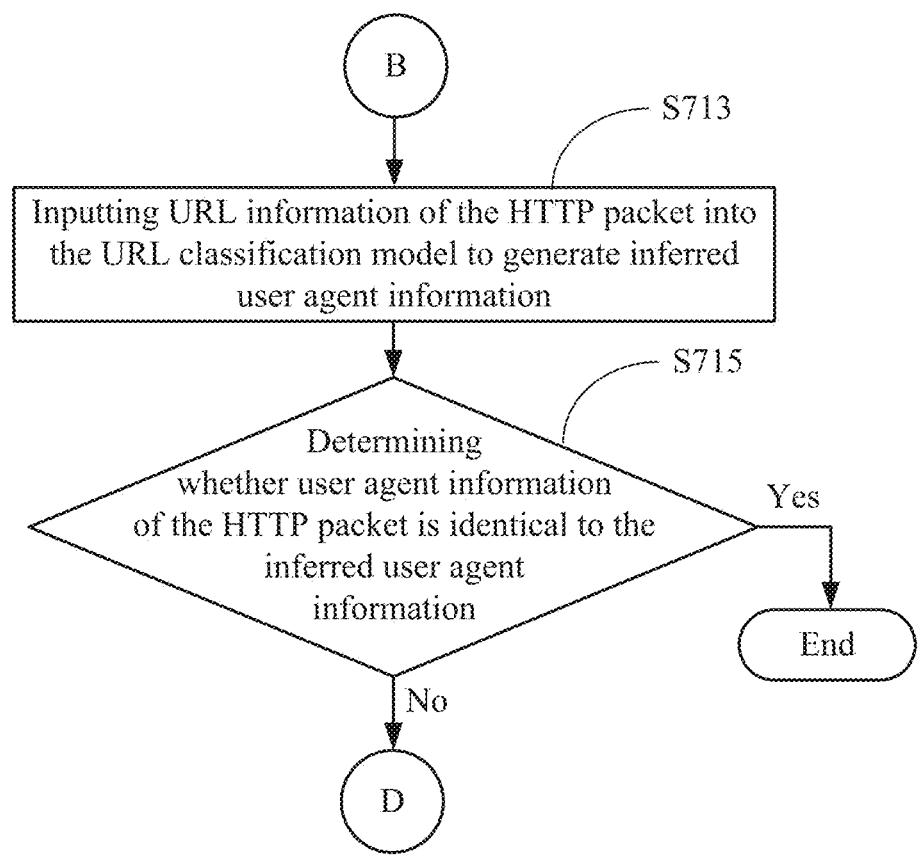

A fourth embodiment of the present invention describes a suspicious packet detection method, and a flowchart diagram thereof is as shown in FIG. 7A to FIG. 7C. The data processing method is for use in a suspicious packet detection device, e.g., the suspicious packet detection device 1 of the aforesaid embodiments. The suspicious packet detection device comprises a storage, a network interface and a processor. The processor is electrically connected to the network interface and the storage. The storage stores a reference file and an emulated fingerprint file. The reference file records a HyperText Transfer Protocol (HTTP) reference header. The emulated fingerprint file records relevance information. The suspicious packet detection method is executed by the processor and comprises steps as follows.

First, in step S701, an HTTP packet transmitted from an internal network to an external network is captured via the network interface. In step S703, an HTTP header of the HTTP packet is compared with the HTTP reference header to determine that the HTTP packet belongs to one of a browser category and an application category and identify the HTTP packet as one of a normal packet and a suspicious packet.

Next, when the HTTP packet is identified as the normal packet and belongs to the browser category, step S705 is executed to determine whether destination domain information and referer information of the HTTP header are included in the relevance information. When the destination domain information and the referer information are not included in the relevance information, step S707 is executed to determine whether the HTTP packet causes a count value associated with the destination domain information within a time window to exceed a first threshold. The count value is the total number of the received HTTP packets within the time window, and another destination domain information and another referer information of another HTTP header of each of the received HTTP packets are not included in the relevance information. If the count value exceeds the first threshold, step S709 is executed to re-identify the HTTP packet as the suspicious packet. Next, in step S711, the HTTP packet is recorded into a suspicious packet historical file. Moreover, if it is determined that the HTTP packet is a suspicious packet in the step S703, then step S711 is also executed to record the HTTP packet into the suspicious packet historical file.

On the other hand, the emulated fingerprint file further records a URL classification model. If the HTTP packet is identified as the normal packet and belongs to the application category in the step S703, then step S713 is executed to input URL information of the HTTP packet into the URL classification model to generate inferred user agent information. Next, in step S715, it is determined whether user agent information of the HTTP packet is identical to the inferred user agent information, and if not, then the step S709 is executed to re-identify the HTTP packet as the suspicious packet.

In an embodiment, the HTTP reference header comprises user agent reference information, language reference information, domain reference information and field reference information. In this case, the step S703 further comprises the following steps: determining whether the user agent information is included in the user agent reference information, and if not, identifying the HTTP packet as the suspicious packet; when the user agent information is included in the user agent reference information and the HTTP packet belongs to the browser category, determining whether language information of the HTTP header is included in the language reference information, identifying the HTTP packet as the normal packet if the language information of the HTTP header is included in the language reference information, and identifying the HTTP packet as the suspicious packet if the language information of the HTTP header is not included in the language reference information; and when the user agent information is included in the user agent reference information and the HTTP packet belongs to the application category, calculating an evaluation value according to whether the destination domain information of the HTTP header is included in the domain reference information, whether field information of the HTTP header is included in the field reference information and whether a packet size of the HTTP packet falls into a permissible range. If the evaluation value is greater than or equal to a second threshold, the HTTP packet is identified as the normal packet. If the evaluation value is less than the second threshold, the HTTP packet is identified as the suspicious packet.

In an embodiment, the step S703 further comprises the following step: determining that the HTTP packet belongs to one of the browser category and the application category by comparing the user agent information of the HTTP header with the user agent reference information. In an embodiment, the user agent reference information comprises browser information and application information. In this case, the step S703 further comprises the following steps: determining whether the user agent information of the HTTP header is included in the browser information; determining that the HTTP packet belongs to the browser category if the user agent information of the HTTP header is included in the browser information; and determining that the HTTP packet belongs to the application category if the user agent information of the HTTP header is not included in the browser information.

In an embodiment, the URL classification model is built through supervised learning according to a sequential analysis algorithm and a many-to-one principle. In an embodiment, the suspicious packet detection method further comprises the following steps: extracting a domain feature, a path feature and a parameter keys feature from the URL information; and inputting the domain feature, the path feature and the parameter keys feature into the URL classification model to generate the inferred user agent information. In an embodiment, the suspicious packet detection method further comprises the following step: analyzing the HTTP packet to obtain the HTTP header.

In addition to the aforesaid steps, the suspicious packet detection method of the present invention can also execute all the operations and have all the corresponding functions described in all the aforesaid embodiments. How this embodiment executes these operations and has these functions will be readily appreciated by those of ordinary skill in the art based on the explanation of all the aforesaid embodiments, and thus will not be further described herein.

According to the above descriptions, the HTTP packet detection mechanism of the present invention may identify suspicious packets by extracting features of HTTP packets for analysis and comparison, and further perform verification through a deep learning algorithm, thereby enhancing the capability of identifying the suspicious packets. Accordingly, the HTTP packet detection mechanism of the present invention can effectively detect the suspicious HTTP packets.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A suspicious packet detection device, comprising:
a storage, being configured to store a reference file and an emulated fingerprint file, the reference file recording a HyperText Transfer Protocol (HTTP) reference header, and the emulated fingerprint file recording relevance information;
a network interface; and
a processor electrically connected to the storage and the network interface, being configured to perform the following operations:
capturing an HTTP packet transmitted from an internal network to an external network via the network interface; and
comparing an HTTP header of the HTTP packet with the HTTP reference header to determine that the HTTP packet belongs to one of a browser category and an application category and identify the HTTP packet as one of a normal packet and a suspicious packet;
wherein when the HTTP packet is identified as the normal packet and belongs to the browser category, the processor further performs the following operations:
determining whether destination domain information and referer information of the HTTP header are included in the relevance information; and
determining whether the HTTP packet causes a count value associated with the destination domain information within a time window to exceed a first threshold when the destination domain information and the referer information are not included in the relevance information, and re-identifying the HTTP packet as the suspicious packet if the count value exceeds the first threshold, wherein the count value is the total number of a plurality of received HTTP packets within the time window, and another destination domain information and another referer information of another HTTP header of each of the received HTTP packets are not included in the relevance information.

2. The suspicious packet detection device of claim 1, wherein the emulated fingerprint file further records a URL classification model, and when the HTTP packet is identified as the normal packet and belongs to the application category, the processor further performs the following operations:
inputting URL information of the HTTP packet into the URL classification model to generate inferred user agent information; and
determining whether user agent information of the HTTP packet is identical to the inferred user agent information, and if not, re-identifying the HTTP packet as the suspicious packet.

3. The suspicious packet detection device of claim 2, wherein the HTTP reference header comprises user agent reference information, language reference information, domain reference information and field reference information, and the processor is further configured to perform the following operations:
determining whether the user agent information is included in the user agent reference information, and if not, identifying the HTTP packet as the suspicious packet;
when the user agent information is included in the user agent reference information and the HTTP packet belongs to the browser category, determining whether language information of the HTTP header is included in the language reference information, identifying the HTTP packet as the normal packet if the language information of the HTTP header is included in the language reference information, and identifying the HTTP packet as the suspicious packet if the language information of the HTTP header is not included in the language reference information; and
when the user agent information is included in the user agent reference information and the HTTP packet belongs to the application category, calculating an evaluation value according to whether the destination domain information of the HTTP header is included in the domain reference information, whether field information of the HTTP header is included in the field reference information and whether a packet size of the HTTP packet falls into a permissible range, determining whether the evaluation value is greater than or equal to a second threshold, identifying the HTTP packet as the normal packet if the evaluation value is greater than or equal to the second threshold, and identifying the HTTP packet as the suspicious packet if the evaluation value is less than the second threshold.

4. The suspicious packet detection device of claim 3, wherein the processor further determines that the HTTP packet belongs to one of the browser category and the application category by comparing the user agent information of the HTTP header with the user agent reference information.

5. The suspicious packet detection device of claim 4, wherein the user agent reference information comprises browser information and application information, and the processor further determines whether the user agent information of the HTTP header is included in the browser information, determines that the HTTP packet belongs to the browser category if the user agent information of the HTTP header is included in the browser information, and determines that the HTTP packet belongs to the application category if the user agent information of the HTTP header is not included in the browser information.

6. The suspicious packet detection device of claim 2, wherein the URL classification model is built through supervised learning according to a sequential analysis algorithm and a many-to-one principle.

7. The suspicious packet detection device of claim 2, wherein the processor further extracts a domain feature, a path feature and a parameter keys feature from the URL information of the HTTP packet and inputs the domain feature, the path feature and the parameter keys feature into the URL classification model to generate the inferred user agent information.

8. The suspicious packet detection device of claim 1, wherein the processor further analyzes the HTTP packet to obtain the HTTP header.

9. A suspicious packet detection method for a suspicious packet detection device, the suspicious packet detection device comprises a storage, a network interface and a processor, the storage storing a reference file and a emulated fingerprint file, the reference file recording a HyperText Transfer Protocol (HTTP) reference header, the emulated fingerprint file recording relevance information, the suspicious packet detection method being executed by the processor and comprising:
capturing an HTTP packet transmitted from an internal network to an external network via the network interface; and
comparing an HTTP header of the HTTP packet with the HTTP reference header to determine that the HTTP packet belongs to one of a browser category and an application category and identify the HTTP packet as one of a normal packet and a suspicious packet;
wherein when the HTTP packet is identified as the normal packet and belongs to the browser category, the suspicious packet detection method further comprises the following steps:
determining whether destination domain information and referer information of the HTTP header are included in the relevance information; and
determining whether the HTTP packet causes a count value associated with the destination domain information within a time window to exceed a first threshold when the destination domain information and the referer information are not included in the relevance information, wherein the count value is a total number of a plurality of received HTTP packets within the time window, and another destination domain information and another referer information of another HTTP header of each of the received HTTP packets are not included in the relevance information; and
re-identifying the HTTP packet as the suspicious packet if the count value exceeds the first threshold.

10. The suspicious packet detection method of claim 9, wherein the emulated fingerprint file further records a URL classification model, and when the HTTP packet is identified as the normal packet and belongs to the application category, the suspicious packet detection method further comprises:
inputting URL information of the HTTP packet into the URL classification model to generate inferred user agent information; and
determining whether user agent information of the HTTP packet is identical to the inferred user agent information, and if not, re-identifying the HTTP packet as the suspicious packet.

11. The suspicious packet detection method of claim 10, wherein the HTTP reference header comprises user agent reference information, language reference information, domain reference information and field reference information, and the suspicious packet detection method further comprises:
  determining whether the user agent information is included in the user agent reference information, and if not, identifying the HTTP packet as the suspicious packet;
  when the user agent information is included in the user agent reference information and the HTTP packet belongs to the browser category, determining whether language information of the HTTP header is included in the language reference information, identifying the HTTP packet as the normal packet if the language information of the HTTP header is included in the language reference information, and identifying the HTTP packet as the suspicious packet if the language information of the HTTP header is not included in the language reference information; and
  when the user agent information is included in the user agent reference information and the HTTP packet belongs to the application category, calculating an evaluation value according to whether the destination domain information of the HTTP header is included in the domain reference information, whether field information of the HTTP header is included in the field reference information and whether a packet size of the HTTP packet falls into a permissible range, identifying the HTTP packet as the normal packet if the evaluation value is greater than or equal to a second threshold, and identifying the HTTP packet as the suspicious packet if the evaluation value is less than the second threshold.

12. The suspicious packet detection method of claim 11, further comprising:
  determining that the HTTP packet belongs to one of the browser category and the application category by comparing the user agent information of the HTTP header with the user agent reference information.

13. The suspicious packet detection method of claim 12, wherein the user agent reference information comprises browser information and application information, and the suspicious packet detection method further comprises:
  determining whether the user agent information of the HTTP header is included in the browser information;
  determining that the HTTP packet belongs to the browser category if the user agent information of the HTTP header is included in the browser information; and
  determining that the HTTP packet belongs to the application category if the user agent information of the HTTP header is not included in the browser information.

14. The suspicious packet detection method of claim 10, wherein the URL classification model is built through supervised learning according to a sequential analysis algorithm and a many-to-one principle.

15. The suspicious packet detection method of claim 10, further comprising:
  extracting a domain feature, a path feature and a parameter keys feature from the URL information; and
  inputting the domain feature, the path feature and the parameter keys feature into the URL classification model to generate the inferred user agent information.

16. The suspicious packet detection method of claim 9, further comprising:
  analyzing the HTTP packet to obtain the HTTP header.

* * * * *